J. Reckendorfer.

Pencil.

No. 3863. Reissued Mar. 1. 1870.

Witnesses.

Thomas D. Stetson

Juan Patterson

Signature.

Jos Reckendorfer

United States Patent Office.

JOSEPH RECKENDORFER, OF NEW YORK, N. Y.

*Letters Patent No.* 36,854, *dated November* 4, 1862; *reissue No.* 3,863, *dated March* 1, 1870.

IMPROVEMENT IN PENCILS.

The Schedule referred to in these Letters Patent and making part of the same.

*To all whom it may concern:*

Be it known that I, JOSEPH RECKENDORFER, of New York, in the county and State of New York, have invented a certain new and improved Pencil; and I hereby declare the following is a full and exact description of the same, reference being had to the accompanying drawings, in which—

Figure 1:
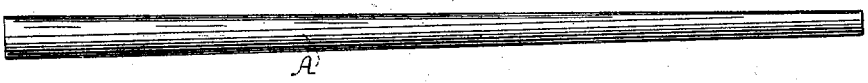
Figure 3:
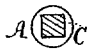
Figure 2:
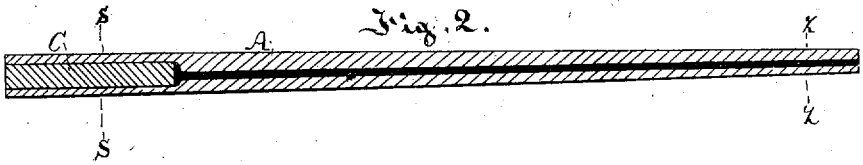

Figure 1 is a side view of a pencil made in accordance with my invention;

Figure 2, a longitudinal section;

Figure 3, a cross-section on the line S S; and

Figure 4:
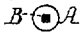

Figure 4, a cross-section on the line Z Z.

My invention is intended to provide a means whereby articles of greater size or diameter than the lead may be securely held in the head of a pencil of otherwise ordinary or suitable construction, without making the body of the pencil cumbrous or inconvenient. To this end, My invention consists—

First, of a pencil composed of a wooden sheath and lead core, having one end of the sheath enlarged and recessed, to constitute a receptacle for an eraser or other similar article, as hereinafter stated.

Second, of a pencil, the wooden case of which gradually tapers from its enlarged and recessed head toward its opposite end for the whole or a portion of its length, as hereinafter set forth.

The receptacle for the eraser or other article is formed in the head without too much weakening the wood, owing to the form of the sheath, while for the same reason the end of the pencil which contains the ordinary lead is not cumbrous nor clumsy, but can be readily held between the fingers, just as an ordinary pencil is.

In the drawings—

A is the wood casing of the pencil, made in two parts, and glued together in the ordinary manner, but made larger at one end than at the other, as represented.

This casing is grooved out with a small groove, for the reception of the black-lead or plumbago B, as usual, but for only a portion of its length. The remainder, at the larger end, has a much larger groove or recess, in which the India rubber C, or other similar article to be therein held, is placed, as represented.

Pencils of equal size throughout have been heretofore made with a slip of rubber fitted in in place of the lead at one end, but such pencils have not become of any considerable practical importance, in consequence of the smallness of the rubber, and it has been held impracticable to make the rubber much larger, without too much weakening the wood or making the entire pencil thick and awkward to handle.

By my invention the size of the rubber may be so increased, while that of the lead remains the same, as to render it a very effective eraser, the size of the pencil-head being such as to render it a convenient receptable for a rubber of much more considerable size or diameter than the lead.

In preparing the wood portions of my pencil, I prefer to saw the material into tapering slips, lying alternately with the ends in opposite directions, and afterward reduce these pieces to the required form, thus economizing material as far as possible.

I make the exterior of my improved pencil of a round, square, hexagonal, octagonal, oval, or other section, as may be desired, and finish it in any style, but always make the head of a larger diameter than the opposite end.

The lead and rubber may also be of any desired section, and may be also tapered, if preferred, but the rubber should always be the larger, and I prefer the uniform section of each, as represented.

Any other erasive material may be substituted for the rubber C without effecting the character of my invention, or a crayon or lead of a different color or quality may be substituted therefor, if desired. Crayons and the softer qualities of lead require a larger section than that given to the part B, and the enlarged head of the pencil will receive them equally as well as the rubber.

What I claim as new, and desire to secure by Letters Patent, is—

1. A pencil composed of a wooden sheath and lead core, having one end of the sheath enlarged and recessed, to constitute a receptacle for an eraser or other similar article, as shown and set forth.

2. A pencil, the wooden case of which gradually tapers from its enlarged and recessed head toward its opposite end, for the whole or a portion of its length, substantially as shown and described.

In testimony whereof I have hereunto affixed my hand this 24th day of December, 1869, before two subscribing witnesses.

JOS. RECKENDORFER.

Witnesses:

A. M. BARKER,

GEO. M. KING.